United States Patent
Lebas et al.

(10) Patent No.: US 9,810,126 B2
(45) Date of Patent: *Nov. 7, 2017

(54) FLOW DEVICE FOR EXHAUST TREATMENT SYSTEM

(71) Applicant: Donaldson Company, Inc., Minneapolis, MN (US)

(72) Inventors: Jérôme Lebas, Précorbin (FR); Stanislas Le Tallec, Saint Jean des Baisants (FR); Antoine Provost, Agneaux (FR); Stéphane Le Merdy, Saint Martin des Besaces (FR); Phebe Helena Preethi, Bloomington, MN (US); Paul Anthony Way, Edina, MN (US)

(73) Assignee: DONALDSON COMPANY, INC., Minneapolis, MN (US)

( * ) Notice: Subject to any disclaimer, the term of this patent is extended or adjusted under 35 U.S.C. 154(b) by 374 days.

This patent is subject to a terminal disclaimer.

(21) Appl. No.: 14/035,234

(22) Filed: Sep. 24, 2013

(65) Prior Publication Data
US 2014/0116037 A1    May 1, 2014

Related U.S. Application Data

(63) Continuation of application No. 12/846,252, filed on Jul. 29, 2010, now Pat. No. 8,539,761.
(Continued)

(51) Int. Cl.
*F01N 1/00* (2006.01)
*F01N 3/28* (2006.01)
(Continued)

(52) U.S. Cl.
CPC ........ *F01N 3/2892* (2013.01); *B01F 3/04049* (2013.01); *B01F 5/0451* (2013.01);
(Continued)

(58) Field of Classification Search
CPC ................ F01N 2240/20; B01F 5/0688
See application file for complete search history.

(56) References Cited

U.S. PATENT DOCUMENTS

| 2,561,457 A | 7/1951 | Beales et al. |
| 2,898,202 A | 8/1959 | Houdry et al. |

(Continued)

FOREIGN PATENT DOCUMENTS

| CN | 1370255 A | 9/2002 |
| CN | 101627190 | 5/2012 |

(Continued)

OTHER PUBLICATIONS

Akiyoshi et al., "Development of Efficient Urea-SCR Systems for EPA 2010-Compliant Medium Duty Diesel Vehicles" Apr. 12, 2011, *SAE International*, 8 pages.
(Continued)

*Primary Examiner* — Mark Laurenzi
*Assistant Examiner* — Jason Sheppard
(74) *Attorney, Agent, or Firm* — Merchant & Gould P.C.

(57) ABSTRACT

An exhaust treatment system includes an exhaust conduit for conveying exhaust gases from an engine of a vehicle. An aftertreatment device is disposed in the exhaust conduit. A flow device is disposed upstream of the aftertreatment device. The flow device includes a base having a first surface and an oppositely disposed second surface. The base defines a plurality of openings. A plurality of flow deflectors is engaged to the base at the plurality of openings. Each flow deflector includes a first deflector that extends outwardly from the first surface of the base and a second deflector that extends outwardly from the second surface of the base. The first and second deflectors define a passage. Flow of exhaust gases through the passage cause exhaust gases to swirl about a longitudinal axis of the exhaust conduit.

19 Claims, 8 Drawing Sheets

Related U.S. Application Data

(60) Provisional application No. 61/294,391, filed on Jan. 12, 2010.

(51) Int. Cl.
  *B01F 3/04* (2006.01)
  *B01F 5/04* (2006.01)
  *B01F 5/06* (2006.01)
  *F01N 3/20* (2006.01)

(52) U.S. Cl.
  CPC .......... *B01F 5/0682* (2013.01); *B01F 5/0688* (2013.01); *F01N 3/2066* (2013.01); *F01N 2240/20* (2013.01)

(56) References Cited

U.S. PATENT DOCUMENTS

| | | |
|---|---|---|
| 2,946,651 A | 7/1960 | Houdry et al. |
| 3,048,376 A | 8/1962 | Howald |
| 3,072,457 A | 1/1963 | Bloch |
| 3,779,335 A | 12/1973 | Chelminski |
| 3,797,240 A | 3/1974 | Inoue et al. |
| 3,835,645 A | 9/1974 | Zoleta |
| 3,863,678 A | 2/1975 | Pettersson et al. |
| 3,867,508 A | 2/1975 | Hass |
| 3,964,875 A | 6/1976 | Chang et al. |
| 4,011,922 A | 3/1977 | Goplen |
| 4,498,786 A | 2/1985 | Ruscheweyh |
| 4,851,015 A | 7/1989 | Wagner et al. |
| 4,902,487 A | 2/1990 | Cooper et al. |
| 4,916,897 A | 4/1990 | Hayashi et al. |
| 4,955,183 A | 9/1990 | Kolodzie et al. |
| 5,138,834 A | 8/1992 | Maund |
| 5,272,871 A | 12/1993 | Oshima et al. |
| 5,315,824 A | 5/1994 | Takeshima |
| 5,355,973 A | 10/1994 | Wagner et al. |
| 5,489,153 A | 2/1996 | Berner et al. |
| 5,540,897 A | 7/1996 | Chu et al. |
| 5,601,792 A | 2/1997 | Hug et al. |
| 5,653,105 A | 8/1997 | Noirot et al. |
| 5,662,869 A | 9/1997 | Abe et al. |
| 5,693,299 A | 12/1997 | Chopin et al. |
| 5,701,735 A | 12/1997 | Kawaguchi |
| 5,772,972 A | 6/1998 | Hepburn et al. |
| 5,884,474 A | 3/1999 | Topsøe |
| 5,916,134 A | 6/1999 | Yang et al. |
| 5,941,069 A | 8/1999 | Heath |
| 5,992,141 A | 11/1999 | Berriman |
| 6,041,594 A | 3/2000 | Brenner |
| 6,050,088 A | 4/2000 | Brenner |
| 6,192,677 B1 | 2/2001 | Tost |
| 6,199,375 B1 | 3/2001 | Russell |
| 6,294,141 B1 | 9/2001 | Twigg et al. |
| 6,312,650 B1 | 11/2001 | Frederiksen et al. |
| 6,314,722 B1 | 11/2001 | Matros et al. |
| 6,401,449 B1 | 6/2002 | Hofmann |
| 6,442,933 B2 | 9/2002 | Rusch |
| 6,444,177 B1 | 9/2002 | Müller et al. |
| 6,449,947 B1 | 9/2002 | Liu et al. |
| 6,539,708 B1 | 4/2003 | Hofmann et al. |
| 6,546,717 B1 | 4/2003 | Chandler et al. |
| 6,606,854 B1 | 8/2003 | Siefker |
| 6,680,037 B1 | 1/2004 | Allansson et al. |
| 6,689,327 B1 | 2/2004 | Reck |
| 6,712,869 B2 | 3/2004 | Cheng |
| 6,722,123 B2 | 4/2004 | Liu |
| 6,722,124 B2 | 4/2004 | Pawson et al. |
| 6,770,252 B2 | 8/2004 | Cheng |
| 6,824,743 B1 | 11/2004 | Pawson et al. |
| 6,863,874 B1 | 3/2005 | Twigg |
| 6,889,500 B1 | 5/2005 | Martinez |
| 6,935,105 B1 | 8/2005 | Page et al. |
| 7,104,251 B2 | 9/2006 | Kim |
| 7,168,241 B2 | 1/2007 | Rudelt et al. |
| 7,448,206 B2 | 11/2008 | Meingast et al. |
| 7,482,986 B2 | 1/2009 | Wu et al. |
| 7,537,083 B2 | 5/2009 | Frederiksen |
| 7,581,389 B2 | 9/2009 | Crawley et al. |
| 7,712,305 B2 | 5/2010 | Kapsos et al. |
| 7,877,983 B2 | 2/2011 | Kinkel et al. |
| 7,896,645 B2 | 3/2011 | Loving |
| 8,015,802 B2 | 9/2011 | Nishiyama et al. |
| 8,033,104 B2 | 10/2011 | Zhang |
| 8,359,838 B2 | 1/2013 | Yamazaki et al. |
| 8,499,548 B2 | 8/2013 | De Rudder et al. |
| 8,539,761 B2 | 9/2013 | Lebas et al. |
| 8,915,064 B2 | 12/2014 | Blaisdell et al. |
| 9,180,407 B2 | 11/2015 | De Rudder et al. |
| 2002/0053287 A1 | 5/2002 | Natarius |
| 2002/0110047 A1 | 8/2002 | Bruck et al. |
| 2002/0162322 A1 | 11/2002 | Ganzmann et al. |
| 2003/0003029 A1 | 1/2003 | Rogers et al. |
| 2003/0079467 A1 | 5/2003 | Liu et al. |
| 2003/0108457 A1 | 6/2003 | Gault et al. |
| 2003/0226539 A1 | 12/2003 | Kim |
| 2004/0040782 A1 | 3/2004 | Frederiksen |
| 2004/0237511 A1 | 12/2004 | Ripper et al. |
| 2005/0013756 A1 | 1/2005 | Amou et al. |
| 2006/0035183 A1 | 2/2006 | Carroni et al. |
| 2006/0053773 A1 | 3/2006 | Mayer et al. |
| 2006/0218902 A1 | 10/2006 | Arellano et al. |
| 2006/0275192 A1 | 12/2006 | Gabrielsson et al. |
| 2007/0101703 A1 | 5/2007 | Kanaya et al. |
| 2007/0144158 A1 | 6/2007 | Girard et al. |
| 2007/0189936 A1 | 8/2007 | Suwabe et al. |
| 2007/0245718 A1 | 10/2007 | Cheng et al. |
| 2007/0261395 A1 | 11/2007 | Mahnken et al. |
| 2007/0274877 A1 | 11/2007 | Bush et al. |
| 2008/0041052 A1 | 2/2008 | Doring et al. |
| 2008/0141662 A1 | 6/2008 | Schuster et al. |
| 2008/0245060 A1 | 10/2008 | Stieglbauer |
| 2009/0000287 A1 | 1/2009 | Blaisdell et al. |
| 2009/0019843 A1 | 1/2009 | Levin et al. |
| 2009/0173063 A1 | 7/2009 | Boorse et al. |
| 2009/0205327 A1 | 8/2009 | Kabat et al. |
| 2009/0313979 A1 | 12/2009 | Kowada |
| 2009/0320453 A1 | 12/2009 | Salanta et al. |
| 2009/0320726 A1 | 12/2009 | Loving |
| 2010/0083643 A1 | 4/2010 | Hayashi et al. |
| 2010/0101222 A1 | 4/2010 | Oesterle et al. |
| 2010/0107612 A1 | 5/2010 | Yamazaki et al. |
| 2010/0132345 A1* | 6/2010 | Solbrig et al. .................. 60/301 |
| 2010/0139258 A1 | 6/2010 | Hackett et al. |
| 2010/0199645 A1 | 8/2010 | Telford |
| 2010/0212292 A1 | 8/2010 | Rusch et al. |
| 2010/0212301 A1 | 8/2010 | De Rudder et al. |
| 2010/0263359 A1 | 10/2010 | Haverkamp et al. |
| 2011/0094206 A1 | 4/2011 | Liu et al. |
| 2011/0113759 A1 | 5/2011 | Tilinski et al. |
| 2011/0167810 A1 | 7/2011 | Lebas et al. |
| 2011/0219755 A1 | 9/2011 | Muller-Haas |
| 2011/0308234 A1 | 12/2011 | De Rudder et al. |
| 2015/0211404 A1 | 7/2015 | Blaisdell et al. |

FOREIGN PATENT DOCUMENTS

| | | |
|---|---|---|
| DE | 35 36 315 A1 | 4/1987 |
| DE | 40 12 411 A1 | 10/1991 |
| DE | 42 03 807 A1 | 8/1993 |
| DE | 199 55 013 A1 | 5/2001 |
| DE | 44 17 238 C2 | 3/2003 |
| DE | 20 2006 011281 | 9/2006 |
| DE | 10 2004 020 138 B4 | 2/2007 |
| DE | 10 2006 019 052 A1 | 10/2007 |
| DE | 10 2007 009 890 A1 | 9/2008 |
| DE | 10 2007 012 790 A1 | 9/2008 |
| DE | 20 2007 010 324 U1 | 1/2009 |
| DE | 10 2008 009 564 A1 | 8/2009 |
| DE | 10 2008 031 136 A1 | 1/2010 |
| DE | 10 2008 048 796 A1 | 3/2010 |
| DE | 10 2009 053 950 A1 | 5/2011 |
| EP | 0319299 | 6/1989 |
| EP | 0 470 361 A1 | 2/1992 |

(56) References Cited

FOREIGN PATENT DOCUMENTS

| | | |
|---|---|---|
| EP | 0 555 746 A1 | 8/1993 |
| EP | 0628706 | 12/1994 |
| EP | 0666099 | 8/1995 |
| EP | 0758713 | 2/1997 |
| EP | 0839996 | 5/1998 |
| EP | 0849441 | 6/1998 |
| EP | 0862941 | 9/1998 |
| EP | 1 054 722 | 11/2000 |
| EP | 0 779 415 B1 | 5/2001 |
| EP | 1 262 644 | 12/2002 |
| EP | 1 109 993 B1 | 5/2003 |
| EP | 1 054 139 B1 | 3/2004 |
| EP | 1 712 753 A2 | 10/2006 |
| EP | 1 770 253 A1 | 4/2007 |
| EP | 1 890 016 A2 | 2/2008 |
| EP | 1947307 | 7/2008 |
| EP | 1 953 359 A1 | 8/2008 |
| EP | 1 712 756 B1 | 3/2009 |
| EP | 2 111 916 A1 | 10/2009 |
| EP | 2 128 398 A1 | 12/2009 |
| EP | 1 781 908 B1 | 3/2010 |
| EP | 2168672 | 3/2010 |
| EP | 2 204 556 A1 | 7/2010 |
| EP | 2 295 756 A1 | 3/2011 |
| EP | 2 325 448 A2 | 5/2011 |
| EP | 2 204 556 B1 | 5/2012 |
| EP | 2 465 602 A2 | 6/2012 |
| EP | 1 770 253 B1 | 9/2012 |
| EP | 2 465 602 B1 | 5/2013 |
| EP | 2 128 398 A1 | 12/2013 |
| FI | 20106317 | 12/2010 |
| FI | 20115569 | 6/2011 |
| FR | 2 384 206 | 10/1978 |
| FR | 2 861 137 A1 | 4/2005 |
| FR | 2 891 305 A1 | 3/2007 |
| GB | 2 381 218 A | 4/2003 |
| GB | 2 434 557 A | 8/2007 |
| JP | 11-166410 | 6/1999 |
| JP | 2000-199423 | 7/2000 |
| JP | 2002-213233 | 7/2002 |
| JP | 2003-193823 | 7/2003 |
| JP | 2003-232218 | 8/2003 |
| JP | 2005-127271 A | 5/2005 |
| JP | 2005-155404 | 6/2005 |
| JP | 2005-273564 | 10/2005 |
| JP | 2006-105414 | 4/2006 |
| JP | 2006-183509 | 7/2006 |
| JP | 2006-205077 | 8/2006 |
| JP | 2007-239486 | 9/2007 |
| JP | 2008-128093 | 6/2008 |
| JP | 2008-274878 | 11/2008 |
| JP | 2008-309000 | 12/2008 |
| JP | 2009-144614 | 7/2009 |
| JP | 2009-150338 A | 7/2009 |
| JP | 2010-101236 | 6/2010 |
| WO | WO 97/01387 | 1/1997 |
| WO | WO 99/44725 | 9/1999 |
| WO | WO 01/04466 A1 | 1/2001 |
| WO | WO 01/12960 | 2/2001 |
| WO | WO 01/42630 | 6/2001 |
| WO | WO 03/004839 A1 | 1/2003 |
| WO | WO 03/036056 A1 | 5/2003 |
| WO | WO 03/104624 A2 | 12/2003 |
| WO | WO 2004/033866 A1 | 4/2004 |
| WO | WO 2004/038192 | 5/2004 |
| WO | WO 2004/113690 | 12/2004 |
| WO | WO 2005/073524 A1 | 8/2005 |
| WO | WO 2006/001855 A2 | 1/2006 |
| WO | WO 2006/009056 | 1/2006 |
| WO | WO 2006/010922 | 2/2006 |
| WO | WO 2006/014129 A1 | 2/2006 |
| WO | WO 2007/127529 A2 | 11/2007 |
| WO | WO 2008/024535 A2 | 2/2008 |
| WO | WO 2008/061734 A1 | 5/2008 |
| WO | WO 2008/111254 A1 | 9/2008 |
| WO | WO 2008/144385 A2 | 11/2008 |
| WO | WO 2009/012885 | 1/2009 |
| WO | WO 2009/024815 A2 | 2/2009 |
| WO | WO 2009/157995 A1 | 12/2009 |
| WO | WO 2010/032077 | 3/2010 |
| WO | WO 2011/106487 A1 | 9/2011 |
| WO | WO 2011/163395 A1 | 12/2011 |

OTHER PUBLICATIONS

Alano et al., "Compact SCR for Passenger Cars" Apr. 12, 2011, *SAE International*, 9 pages.

International Search Report and Written Opinion mailed Oct. 18, 2010.

Jungmin Seo, "Aftertreatment Package Design for SCR Performance Optimization" Apr. 12, 2011, *SAE International*, 7 pages.

\* cited by examiner

US 9,810,126 B2

1

FLOW DEVICE FOR EXHAUST TREATMENT SYSTEM

CROSS-REFERENCE TO RELATED APPLICATIONS

This application is a continuation of application Ser. No. 12/846,252, filed Jul. 29, 2010, now U.S. Pat. No. 8,539,761, which claims the benefit of provisional application Ser. No. 61/294,391, filed Jan. 12, 2010, which applications are incorporated herein by reference in their entireties.

BACKGROUND

Vehicles equipped with diesel engines typically include exhaust systems that have aftertreatment components such as selective catalytic reduction catalyst devices, lean NOx catalyst devices, or lean NOx trap devices to reduce the amount of undesirable gases, such as nitrogen oxides (NOx) in the exhaust. In order for these types of aftertreatment devices to work properly, a doser injects reactants, such as urea, ammonia, or hydrocarbons, into the exhaust gas. As the exhaust gas and reactants flow through the aftertreatment device, the exhaust gas and reactants convert the undesirable gases, such as NOx, into more acceptable gases, such as nitrogen and oxygen. However, the efficiency of the aftertreatment system depends upon how evenly the reactants are mixed with the exhaust gases. Therefore, there is a need for a flow device that provides a uniform mixture of exhaust gases and reactants.

SUMMARY

An aspect of the present disclosure relates to an exhaust treatment system. The exhaust treatment system includes an exhaust conduit for conveying exhaust gases from an engine of a vehicle. An aftertreatment device is disposed in the exhaust conduit. A flow device is disposed upstream of the aftertreatment device. The flow device includes a base having a first surface and an oppositely disposed second surface. The base defines a plurality of openings. A plurality of flow deflectors is engaged to the base at the plurality of openings. Each flow deflector includes a first deflector that extends outwardly from the first surface of the base and a second deflector that extends outwardly from the second surface of the base. The first and second deflectors define a passage. Flow of exhaust gases through the passage cause exhaust gases to swirl about a longitudinal axis of the exhaust conduit.

Another aspect of the present disclosure relates to a flow device. The flow device includes a base having a first surface and an oppositely disposed second surface. The base defines a plurality of openings. A plurality of flow deflectors is engaged to the base at the plurality of openings. Each flow deflector includes a first deflector that extends outwardly from the first surface of the base and a second deflector that extends outwardly from the second surface of the base. The first and second deflectors define a passage. Flow of exhaust gases through the passage cause exhaust gases to swirl about a central axis of the base.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
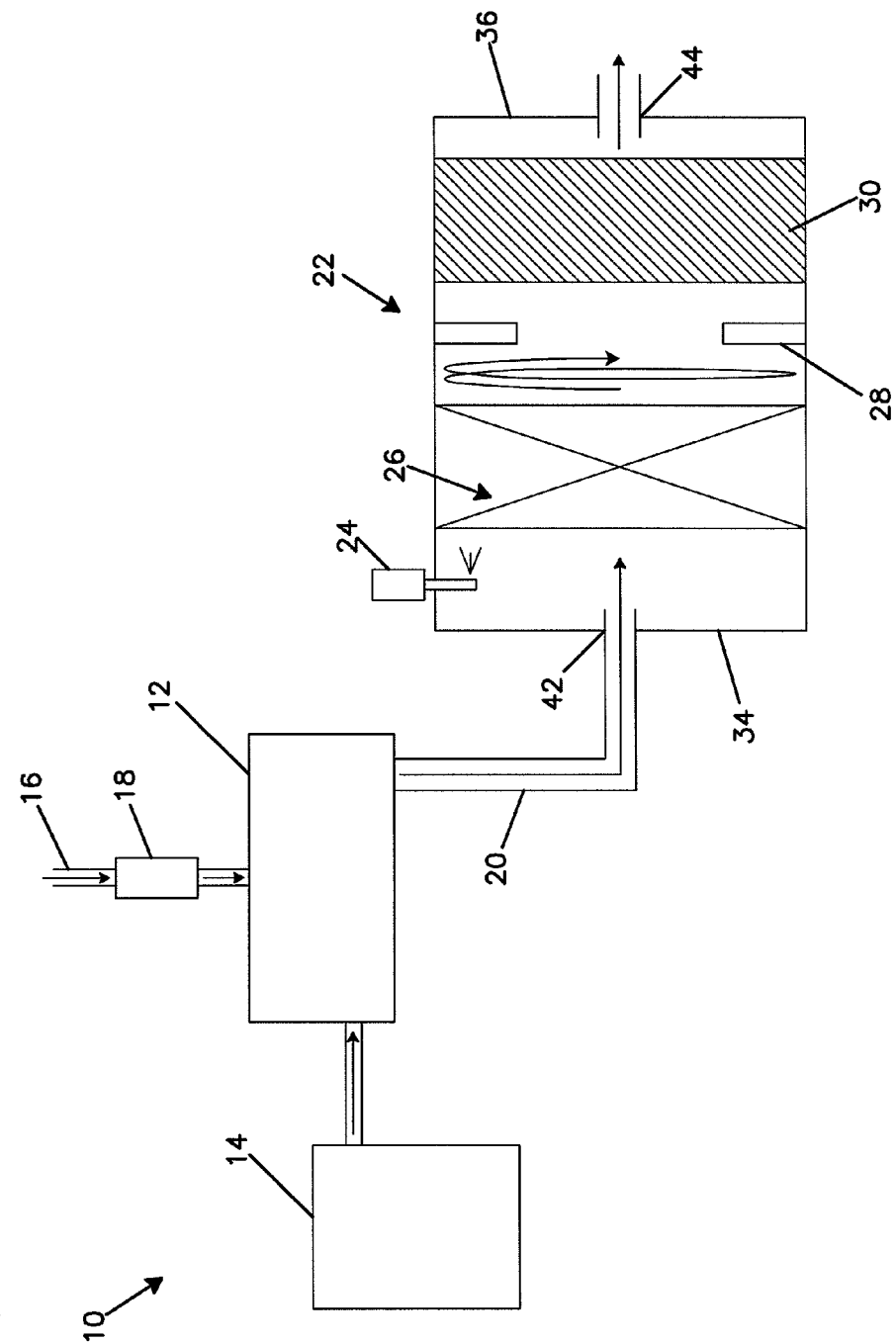
FIG. 1 is a schematic representation of an engine exhaust system having exemplary features of aspects in accordance with the principles of the present disclosure.

Referring now to FIG. 1, an engine exhaust system, generally designated 10, is shown. The engine exhaust system 10 includes an engine 12, a fuel tank 14 for supplying fuel (e.g., diesel fuel) to the engine 12, an air intake 16, an air filter 18, and an exhaust conduit 20 for conveying exhaust gas away from the engine 12. The engine exhaust system 10 also includes an exhaust treatment system, generally designated 22, which is in communication with the exhaust conduit 20. In the subject embodiment, the exhaust treatment system 22 includes a doser 24, a flow device, generally designated 26, a baffle or a diameter restriction 28, and an aftertreatment device, generally designated 30.

The aftertreatment device 30 can include a structure such as a catalytic converter, diesel particulate filter, a selective catalytic reduction (SCR) catalyst device, a lean NOx catalyst device, a lean NOx trap, or other device for removing pollutants from the exhaust stream. As these types of aftertreatment devices 30 are well known to those skilled in the art, the aftertreatment devices 30 will only be briefly described herein.

Catalytic converters (diesel oxidation catalysts or DOC's) are typically used in an exhaust system to convert undesirable gases such as carbon monoxide and hydrocarbons from a vehicle's exhaust into carbon dioxide and water. DOC's can have a variety of known configurations. Exemplary configurations include substrates defining channels that extend completely therethrough. Exemplary catalytic converter configurations having both corrugated metal and porous ceramic substrates/cores are described in U.S. Pat. No. 5,355,973, which is hereby incorporated by reference in its entirety. The substrates preferably include a catalyst. For example, the substrate can be made of a catalyst, impregnated with a catalyst or coated with a catalyst. Exemplary catalysts include precious metals such as platinum, palladium and rhodium, and other types of components such as base metals or zeolites.

In one non-limiting embodiment, a catalytic converter can have a cell density of at least 200 cells per square inch, or in the range of 200-400 cells per square inch. A preferred catalyst for a catalytic converter is platinum with a loading level greater than 30 grams/cubic foot of substrate. In other embodiments the precious metal loading level is in the range of 30-100 grams/cubic foot of substrate. In certain embodiments, the catalytic converter can be sized such that in use, the catalytic converter has a space velocity (volumetric flow rate through the DOC/volume of DOC) less than 150,000/hour or in the range of 50,000-150,000/hour.

The diesel particulate filter (DPF), on the other hand, is typically used in an exhaust system to remove particulate matter (e.g., carbon based particulate matter such as soot) from the exhaust. DPF's can have a variety of known configurations. An exemplary configuration includes a monolith ceramic substrate having a "honey-comb" configuration of plugged passages as described in U.S. Pat. No. 4,851,015, which is hereby incorporated by reference in its entirety. Wire mesh configurations can also be used. In certain embodiments, the substrate can include a catalyst. Exemplary catalysts include precious metals such as platinum, palladium and rhodium, and other types of components such as base metals or zeolites.

For certain embodiments, diesel particulate filters can have a particulate mass reduction efficiency greater than 75%. In other embodiments, diesel particulate filters can have a particulate mass reduction efficiency greater than 85%. In still other embodiments, diesel particulate filters can have a particulate mass reduction efficiency equal to or greater than 90%. For purposes of this specification, the particulate mass reduction efficiency is determined by subtracting the particulate mass that enters the diesel particulate filter from the particulate mass that exits the diesel particulate filter, and by dividing the difference by the particulate mass that enters the diesel particulate filter.

The selective catalytic reduction (SCR) catalyst device is typically used in an exhaust system to remove undesirable gases such as nitrogen oxides (NOx) from the vehicle's emissions. SCR's are capable of converting NOx to nitrogen and oxygen in an oxygen rich environment with the assistance of reactants such as urea or ammonia, which are injected into the exhaust stream upstream of the SCR through the doser 24.

The lean NOx catalyst device is also capable of converting NOx to nitrogen and oxygen. In contrast to SCR's, lean NOx catalysts use hydrocarbons as reducing agents/reactants for conversion of NOx to nitrogen and oxygen. The hydrocarbon is injected into the exhaust stream upstream of the lean NOx catalyst. At the lean NOx catalyst, the NOx reacts with the injected hydrocarbons with the assistance of a catalyst to reduce the NOx to nitrogen and oxygen. While the exhaust treatment system 22 will be described as including an SCR, it will be understood that the scope of the present disclosure is not limited to an SCR as there are various catalyst devices that can be used in accordance with the principles of the present disclosure.

The lean NOx traps use a material such as barium oxide to absorb NOx during lean burn operating conditions. During fuel rich operations, the NOx is desorbed and converted to nitrogen and oxygen by reaction with hydrocarbons in the presence of catalysts (precious metals) within the traps.

Figure 2:
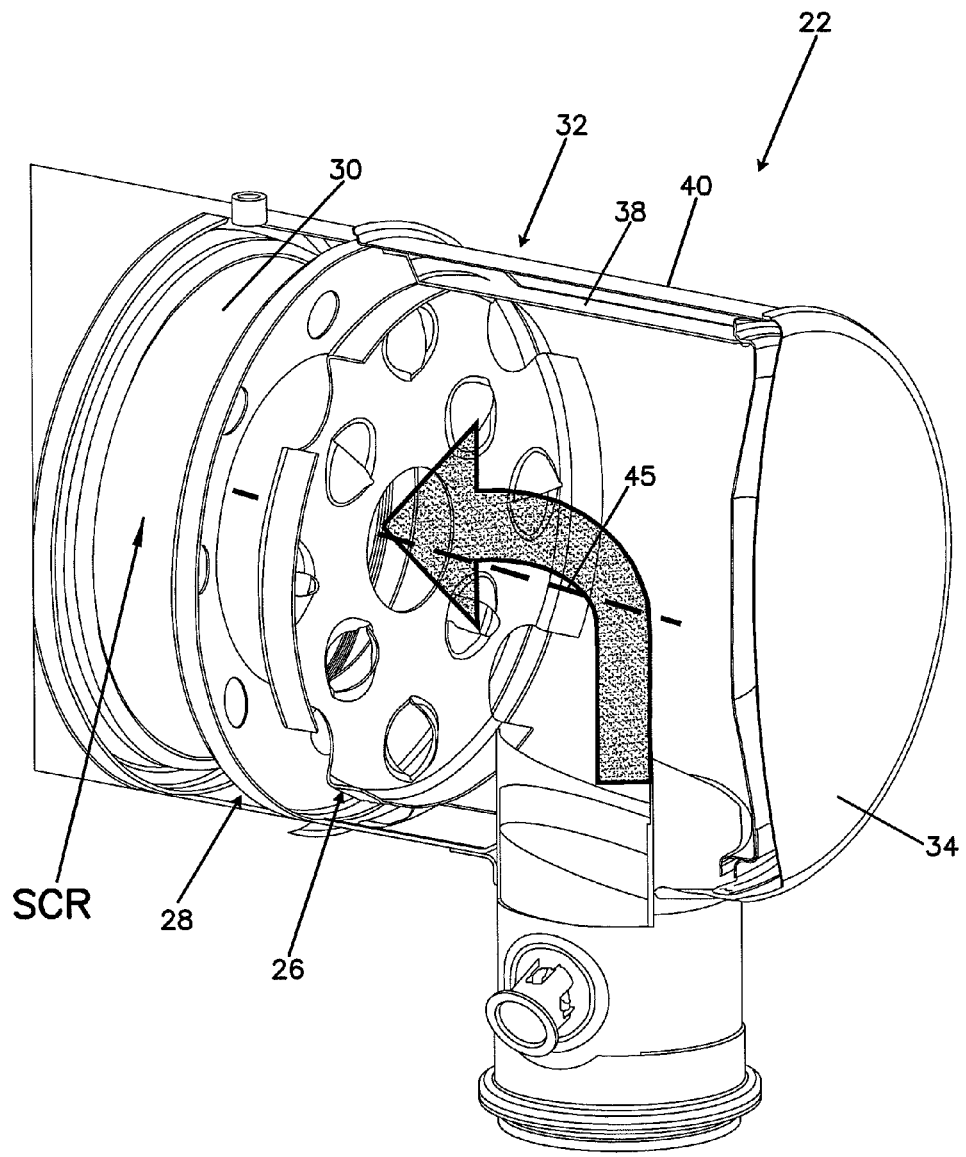
FIG. 2 is a fragmentary perspective view of an exhaust treatment system suitable for use in the engine exhaust system of FIG. 1.

Referring now to FIGS. 1 and 2, in the subject embodiment, the exhaust treatment system 22 includes a housing assembly, generally designated 32, having a first axial end 34 and an oppositely disposed second axial end 36. In the depicted embodiment of FIG. 2, a portion of the housing assembly 32 is a double walled structure having an inner wall 38 and an outer wall 40.

In the subject embodiment, the first axial end 34 includes an inlet 42. In one embodiment, the inlet 42 is generally aligned with the exhaust conduit 20. In another embodiment, the inlet 42 is disposed in a sidewall adjacent to the first axial end 34. The second axial end 36 of the housing assembly 32 includes an outlet 44. In the subject embodiment, the flow device 26, which will be described in greater detail subsequently, is disposed within the housing assembly 32 and positioned adjacent to the inlet 42. The aftertreatment device 30 is disposed within the housing assembly 32 and positioned between the flow device 26 and the outlet 44. The baffle 28 is disposed within the housing assembly 32 and positioned downstream of the flow device 26 such that the baffle 28 is located between the flow device 26 and the aftertreatment device 30.

Referring now to FIGS. 1-7, the flow device 26 will be described. The flow device 26 is adapted to receive exhaust gases in a generally axial direction and to redirect the exhaust gases so that at least a portion of the exhaust gases swirl about a longitudinal axis 45 of the housing assembly 32. In the subject embodiment, the flow device 26 includes a body 46 having a base 48 and a plurality of flow deflectors 50.

In the depicted embodiment, the base 48 is generally planar in shape. The base 48 includes a first surface 52 and an oppositely disposed second surface 54. The first surface 52 faces in a direction toward the aftertreatment device 30 while the second surface 54 faces in a direction toward the inlet 42 of the housing assembly 32.

The body 46 further includes a plurality of outer edge portions 56 disposed at a periphery 58 of the base 48. The outer edge portions 56 extend outwardly from the base 48 in a direction that is generally perpendicular to the first surface 52. In the depicted embodiment, there are four outer edge portions 56.

The outer edge portions 56 are separated by notches 60. In the depicted embodiment, the notches 60 are arcuate in shape and are disposed at the periphery 58 of the base 48. The notches 60 extend through the first and second surfaces 52, 54 of the base 48. The outer edge portions 56 and the notches 60 are alternately disposed about the periphery 58 of the base 48 in a symmetrical configuration. In the subject embodiment, there are four outer edge portions 56 and four notches 60. Each of the four notches 60 is disposed 90° from an adjacent notch 60.

In the depicted embodiment, the body 46 is generally circular in shape. The outer edge portions 56 define a diameter D that is sized so that when the body 46 is disposed in the housing assembly 32, the outer edge portions 56 of the body 46 substantially block the flow of exhaust between the outer edge portions 56 and the housing assembly 32. While the outer edge portions 56 block the flow of exhaust between the outer edge portions 56 and the housing assembly 32, the notches 60 are sized to allow some exhaust to flow axially through the notches 60. In the subject embodiment, the outer edge portions 56 of the body 46 are mounted (e.g., spot welded, etc.) to an inner diameter of the housing assembly 32.

Referring now to FIGS. 3-7, the flow deflectors 50 will be described. In the depicted embodiment, the body 46 includes a first plurality of flow deflectors 50a and a second plurality of flow deflectors 50b. In the depicted embodiment, each of the first and second pluralities of flow deflectors 50a, 50b are symmetrically arranged about a central axis 62 that extends through a center of the base 48 of the body 46. Each of the flow deflectors 50 of the first plurality of flow deflectors 50a is disposed a first radial distance $R_1$ from the central axis 62 while each of the flow deflectors 50 of the second plurality of flow deflectors 50b is disposed a second radial distance $R_2$ from the central axis 62. In the depicted embodiment, the second radial distance $R_2$ is less than the first radial distance $R_1$.

In the depicted embodiment, the flow deflectors 50 of the first plurality of flow deflectors 50a are disposed between adjacent notches 60. In the depicted embodiment, the first plurality of flow deflectors 50a includes four flow deflectors 50. The flow deflectors 50 of the first plurality of flow deflectors 50a are disposed at 45° from the adjacent notches 60.

In the depicted embodiment, the flow deflectors 50 of the second plurality of flow deflectors 50b are generally aligned with the notches 60. In the depicted embodiment, the second plurality of flow deflectors 50b includes four flow deflectors 50.

Each of the flow deflectors 50 includes an opening 64 that extends through the first and second surfaces 52, 54 of the base 48. In the depicted embodiment, the opening 64 is generally oval in shape when viewed in a direction that is generally perpendicular to the base 48 and includes a major axis and a minor axis. The major axis is greater than the minor axis.

Each of the flow deflectors 50 further includes a first deflector 66 and a second deflector 68. The first deflector 66 extends outwardly from the first surface 52 while the second deflector 68 extends outwardly from the second surface 54. In the depicted embodiment, each of the first and second deflectors 66, 68 is curved so that each of the first and second deflectors 66, 68 is generally scoop shaped.

Each of the first and second deflectors 66, 68 includes a perimeter 70 having a first portion 72 and a second portion 74. The first portion 72 of the perimeter 70 of each of the first and second deflectors 66, 68 extends around a portion of the opening 64. The first portion 72 of the first deflector 66 is engaged to the first surface 52 of the base 48 at the opening 64 while the first portion 72 of the second deflector 68 is engaged to the second surface 54 of the base 48 at the opening 64. In the depicted embodiment, the first portion 72 of the perimeter 70 of each of the first and second deflectors 66, 68 is monolithic with the base 48 at the opening 64.

The second portion 74 of the perimeter 70 of each of the first and second deflectors 66, 68 extends across the opening 64. The second portion 74 of the perimeter 70 of each of the first and second deflectors 66, 68 is disposed outwardly from the base 48. The second portion 74 of the perimeter 70 of the first deflector 66 extends outwardly from the first surface 52 while the second portion 74 of the perimeter 70 of the second deflector extends outwardly from the second surface 54. In the depicted embodiment, a central location 76 (shown in FIG. 6) along the second portion 74 of the perimeter 70 of each of the first and second deflectors 66, 68 is the farthest extending location along the second portion 74 from the base 48 so that the second portion 74 is generally parabolic in shape.

The first and second deflectors 66, 68 are oppositely arranged about the opening 64. The second portion 74 of the perimeter 70 of the first deflector 66 faces a first direction while the second portion 74 of the perimeter 70 of the second deflector 68 faces a second direction that is opposite from the first direction.

Figure 7:
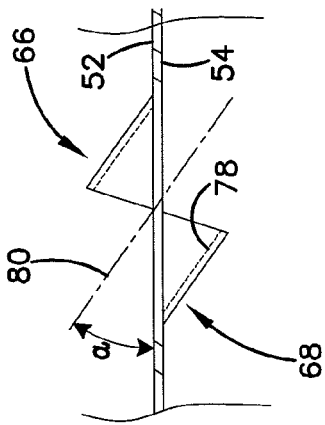
FIG. 7 is a fragmentary cross-sectional view of the flow device taken on line 7-7 of FIG. 6.
Figure 5:
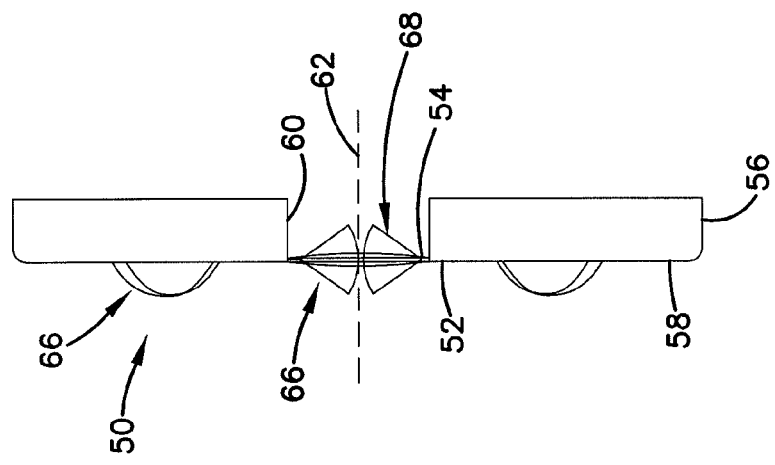
FIG. 5 is a side view of the flow device of FIG. 3.

Referring now to FIG. 7, the first and second deflectors 66, 68 define a passage 78 through the base 48 of the flow device 26. A central longitudinal axis 80 extends through the center of the passage 78. The central longitudinal axis 80 is disposed at an angle α with respect to the base 48 of the flow device 26. In one embodiment, the angle α is less than 90°. In another embodiment, the angle α is in the range of about 15° to about 75°. In another embodiment, the angle α is in the range of about 30° to about 60°. In another embodiment, the angle α is less than or equal to about 45°. It will be understood that the angle α of the present disclosure is measured in accordance with the reference symbol "α" as shown in FIG. 7.

Figure 3:
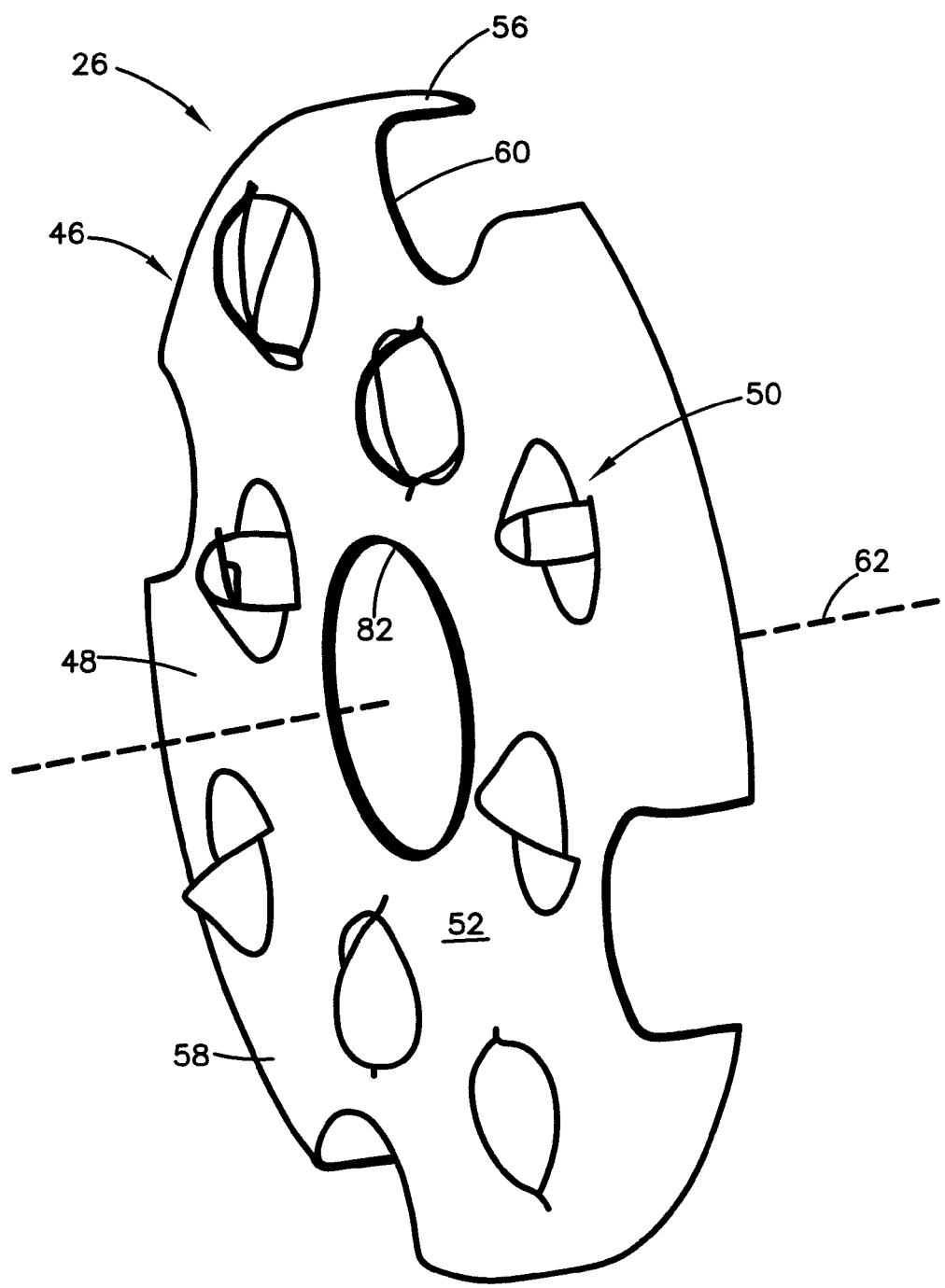
FIG. 3 is a perspective view of a flow device suitable for use in the exhaust treatment system of FIG. 2.
Figure 4:
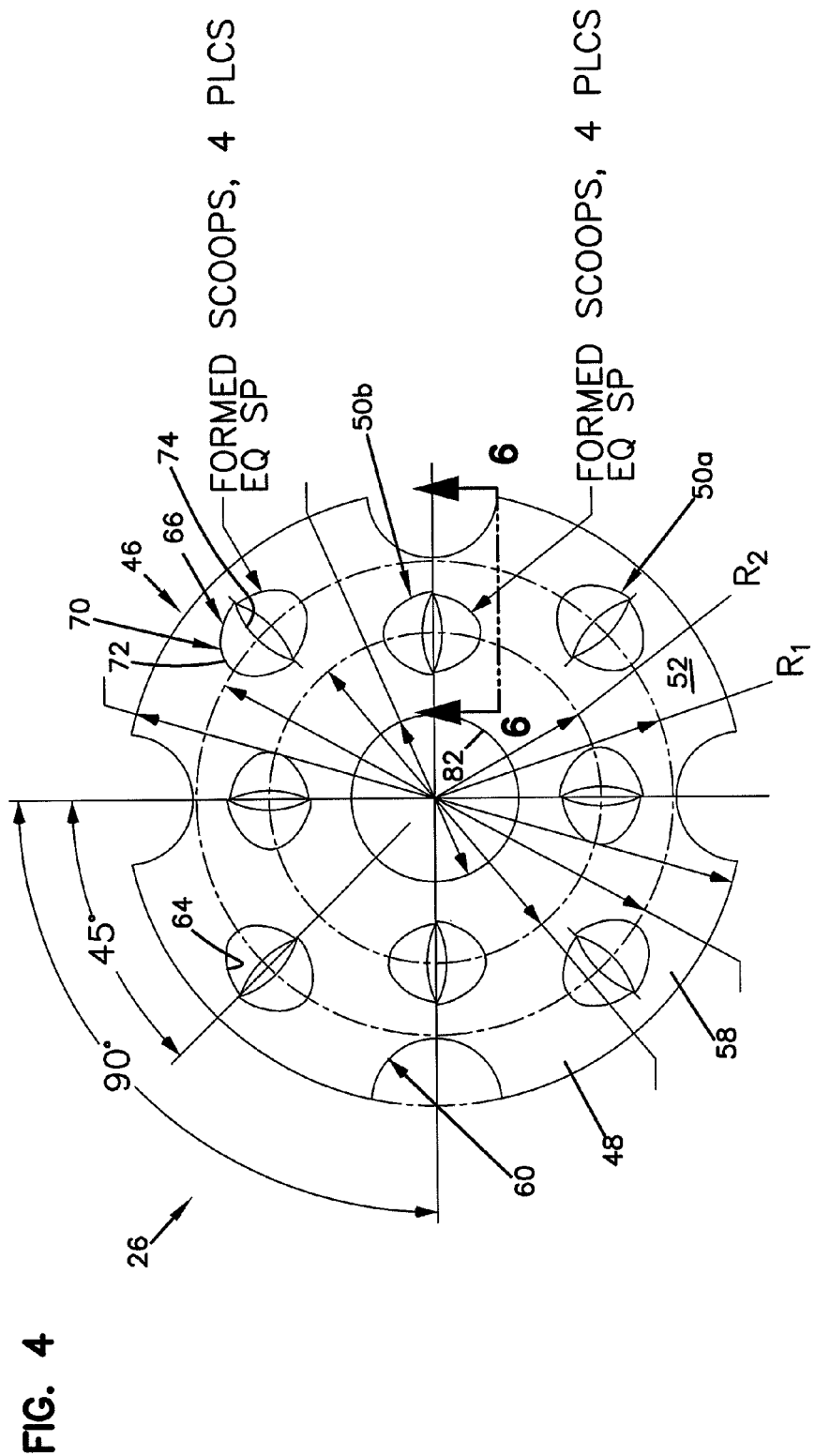
FIG. 4 is a front view of the flow device of FIG. 3.
Figure 6:
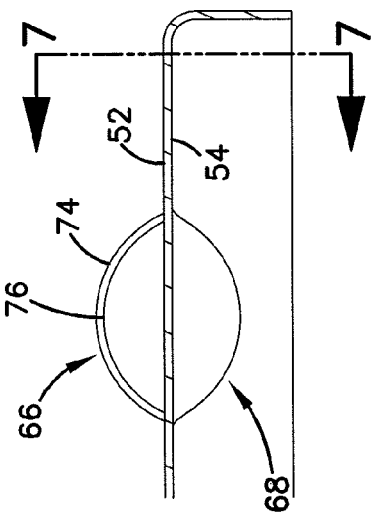
FIG. 6 is a fragmentary cross-sectional view of the flow device taken on line 6-6 of FIG. 4.

Referring now to FIGS. 3 and 4, the base 48 of the flow device 26 defines a central opening 82. The central opening 82 extends through the first and second surfaces 52, 54 of the base 48. An inner radius $R_3$ of the central opening is less than the second radial distance $R_2$ of the second plurality of flow deflectors 50b. The central opening 82 allows a portion of the exhaust gases to flow axially through the flow device 26 which may reduce backpressure.

Figure 8:
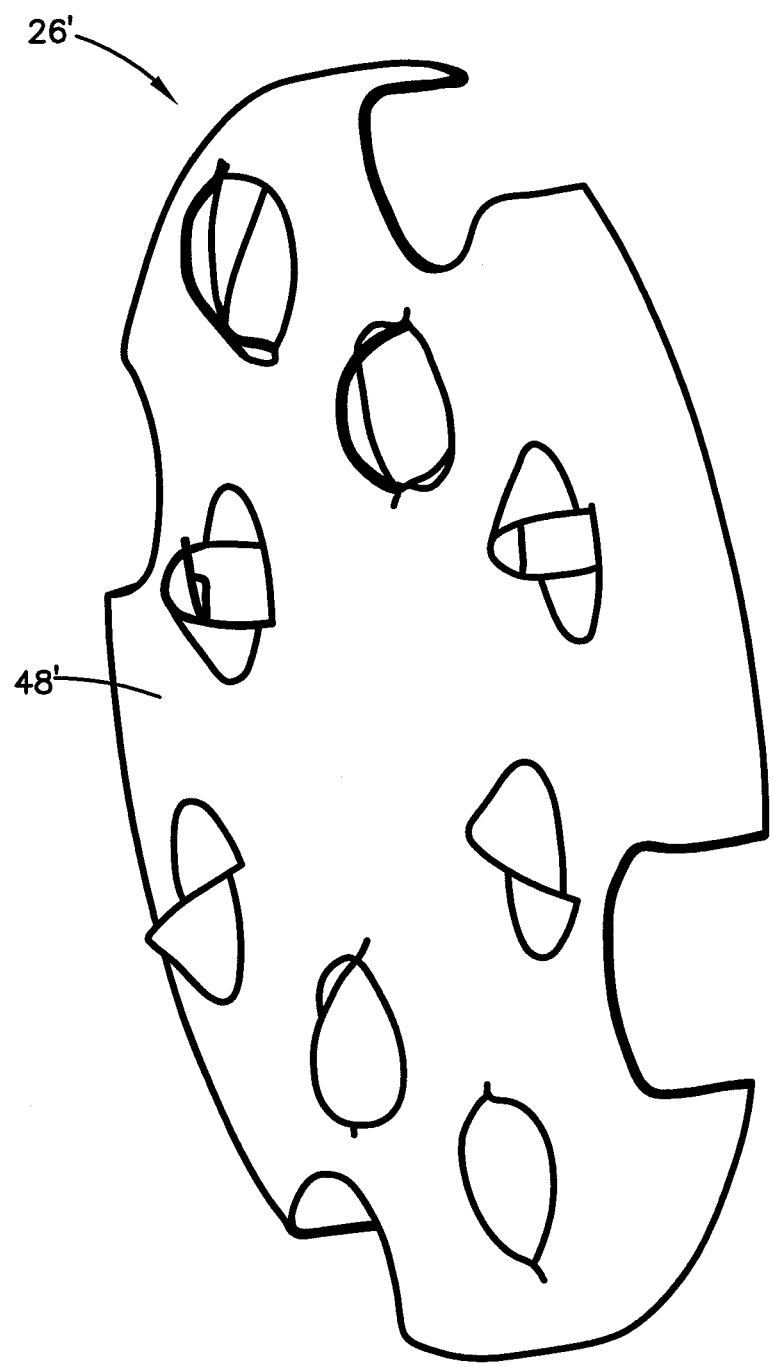
FIG. 8 is a perspective view of an alternate embodiment of the flow device.
Figure 9:
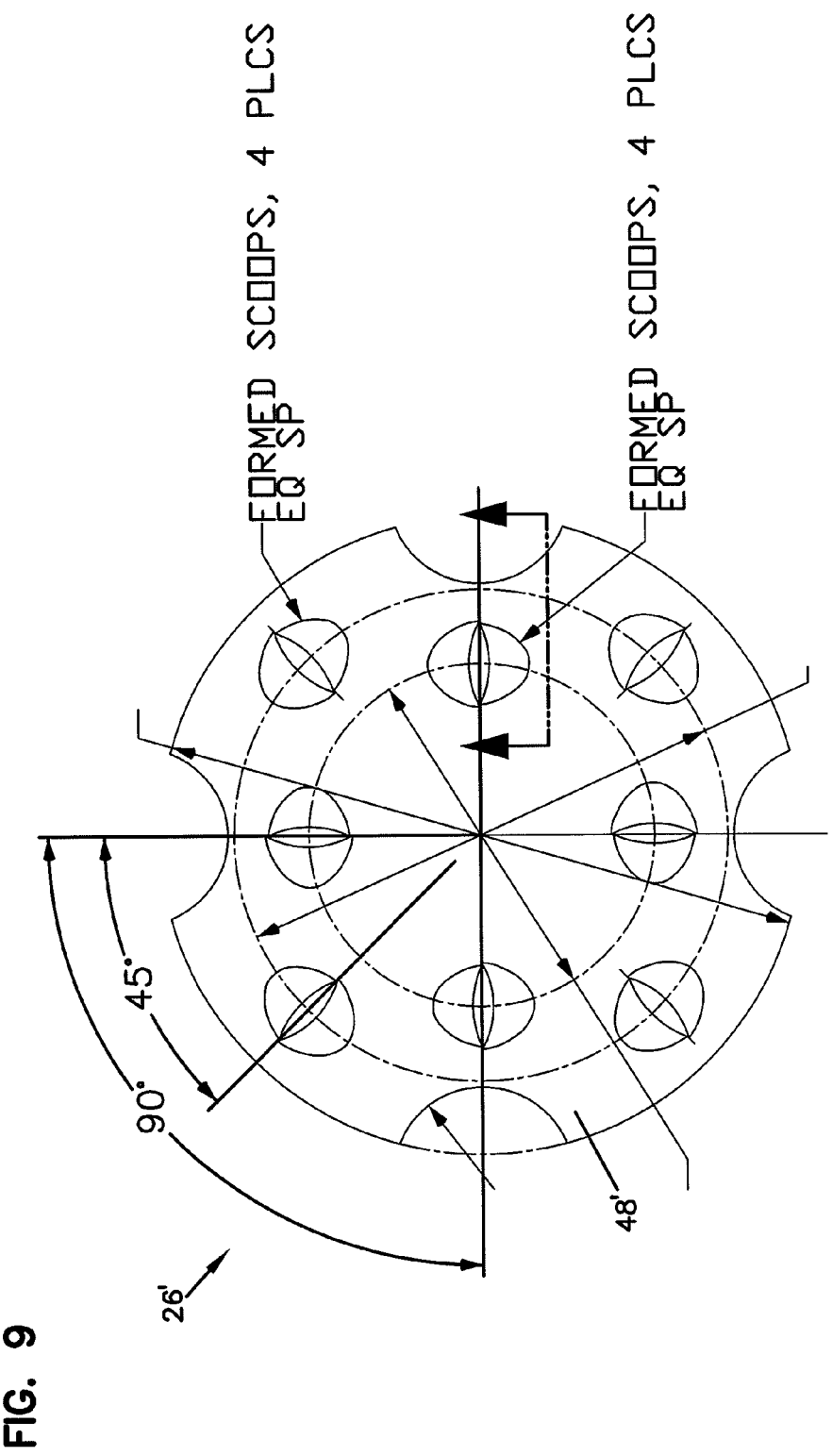
FIG. 9 is a front view of the flow device of FIG. 8.

Referring now to FIGS. 8 and 9, an alternate embodiment of a flow device 26' is shown. The flow device 26' is structurally similar to the flow device 26 described above. However, in the depicted embodiment of FIGS. 8 and 9, a base 48' of the flow device 26' does not include the central opening 82.

Figure 11:
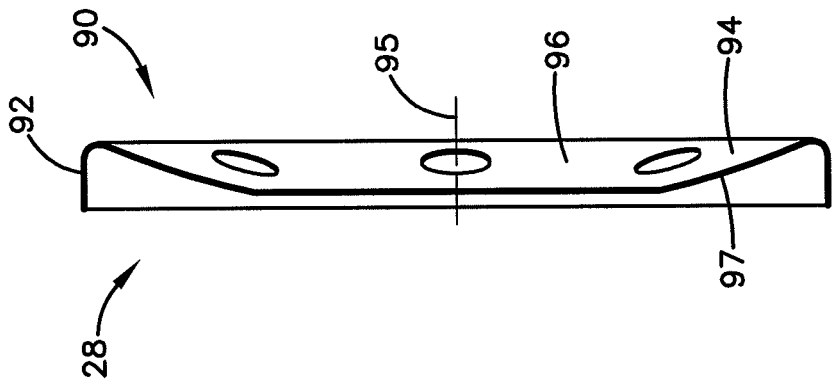
FIG. 11 is a cross-sectional view of the baffle of FIG. 10.
Figure 10:
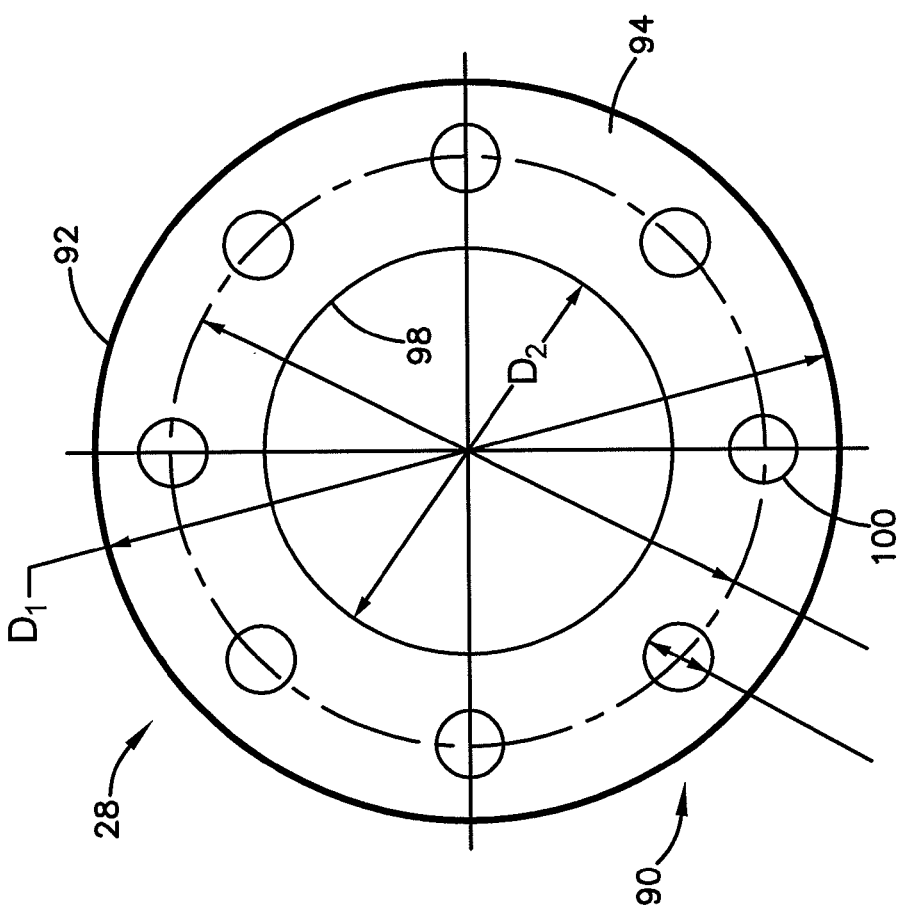
FIG. 10 is a front view of a baffle suitable for use with the exhaust treatment system of FIG. 2.

Referring now to FIGS. 10 and 11, the baffle 28 is shown. The baffle 28 includes a body 90.

In the depicted embodiment, the body 90 includes an outer rim portion 92 and a diameter restriction portion 94. The outer rim portion 92 is adapted for engagement (e.g., interference-fit, press-fit, weld, spot weld, adhere, etc.) with the housing assembly 32. In the depicted embodiment, the outer rim portion 92 is generally parallel to a central axis 95 that extends through the center of the body 90. The outer rim portion 92 includes an outer diameter $D_1$.

The diameter restriction portion 94 includes a first surface 96 and an oppositely disposed second surface 97. The first surface 96 is generally concave. In the depicted embodiment, the diameter restriction portion 94 is generally frusto-spherical in shape. In an alternate embodiment, the diameter restriction portion 94 is generally frusto-conical in shape. In the depicted embodiment of FIG. 2, the first surface 96 of the baffle 28 faces toward the first surface 52 of the flow device 26.

The diameter restriction portion 94 defines a central opening 98 that extends through the body 90 and defines an inner diameter $D_2$. The inner diameter $D_2$ of the central opening 98 is less than the outer diameter $D_1$ of the outer rim portion 92 so that the central opening 98 is less than the inner diameter of the exhaust conduit 20.

The diameter restriction portion 94 further defines a plurality of openings 100 disposed about the central axis 96 so that the plurality of openings 100 is disposed between the inner diameter $D_2$ of the diameter restriction portion 94 and the outer diameter $D_1$ of the outer rim portion 92. The plurality of openings 100 is symmetrically disposed about the central axis 95. In the subject embodiment, the plurality of openings 100 includes eight openings.

Referring now to FIG. 1, the doser 24 will be described. The doser 24 injects reactants (e.g., urea, ammonia, hydrocarbons) into the exhaust gases. The reductants in the exhaust gases help the aftertreatment device 30 in converting the NOx to nitrogen and oxygen. In the depicted embodiment of FIG. 1, the doser 24 is disposed upstream of the fluid device 26 in the depicted embodiment. By injecting the reactants into the exhaust gases at a location upstream from the flow device 26, the reactants from the doser 24 are subjected to the circumferential swirling of the exhaust for a greater axial distance thereby resulting in a more uniform mixture of exhaust gases and reductants.

Referring now to FIGS. 1-7, the flow of exhaust gases through the exhaust treatment system 22 will be described. Exhaust enters the housing assembly 32. The exhaust gases enter the flow device 26. A portion of the exhaust gases flow axially through the notches 60. Another portion of the exhaust gases flow through the passages 78 of the flow deflectors 50. As the exhaust gases flow through passages 78, the flow direction of the exhaust gases change from a generally axial direction to a direction that swirls about the longitudinal axis 45 of the housing assembly 32. The doser 24, in the subject embodiment, injects reactants (e.g., urea, ammonia, hydrocarbons) into the exhaust gases forming an exhaust mixture.

Due to the swirling of the exhaust gases, the reactants are uniformly distributed in the exhaust. Uniform distribution of the reactants is important for the aftertreatment device 30 to perform effectively. In the prior art exhaust treatment systems, uniform distribution of the doser contents into the exhaust gases was achieved through a long axial distance between the doser and the aftertreatment device. However, by changing the flow direction of the exhaust gases, the exhaust gases and the contents of the doser that are injected into the exhaust gases are effectively mixed over a much smaller axial distance. Therefore, one advantage of the present disclosure is that it provides a uniform mixture of the exhaust and the contents of the doser 24 over a small axial distance. Additionally, the swirling action allows reactants to vaporize and/or hydrolyze in a relatively short axial distance. For example, a reactant such as urea can be vaporized and decomposed into ammonia and carbon dioxide while swirling thereby shortening the axial distance required for the vaporization and decomposition of the urea to occur.

The exhaust mixture exits the flow device 26 and flows through the central opening 98 of the diameter restriction portion 94 of the baffle 28. As the exhaust mixture swirls in the housing assembly 32, heavier reactants (e.g., unvaporized or unhydrolyzed reactants) in the exhaust mixture are pushed radially outward from the exhaust mixture by centrifugal force such that the heavier reactants are retained against a wall of the housing assembly 32. As the exhaust mixture circumferentially flows past the reactants disposed against the wall of the housing assembly 32, these reactants are vaporized or hydrolyzed. After the vaporization or hydrolyzation of these reactants, the reactants reenter the exhaust mixture and pass through the central opening 98 of the plurality of openings 96 in the baffle 28. After the exhaust mixture passes through the baffle 28, the exhaust mixture enters the aftertreatment device 30.

By retaining the unvaporized or unhydrolyzed reactants at the baffle 28, the baffle 28 eliminates or reduces the amount of unvaporized or unhydrolyzed reactants in the exhaust mixture at the aftertreatment device 30. Since the efficiency of the exhaust treatment system 22 increases as the amount of unvaporized or unhydrolyzed reactants in the exhaust mixture decreases, the combination of the flow device 26 and the baffle 28 allows for a more efficient exhaust treatment system 22 in a more compact space.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. An exhaust conduit adapted to cause exhaust gases to swirl about a longitudinal axis of the exhaust conduit when the exhaust gases flow through the exhaust conduit, the exhaust conduit comprising:
   a wall having a first side and an oppositely disposed second side, the wall defining a central flow passage extending through the wall, wherein the central flow passage is centered about the longitudinal axis of the exhaust conduit; and
   a plurality of flow deflecting passages extending through the wall, the plurality of flow deflecting passages being positioned around the central flow passage, the plurality of flow deflecting passages including a first set disposed at a first radial distance from the longitudinal axis and a second set disposed at a second radial distance from the longitudinal axis, and wherein the second radial distance is less than the first radial distance, the flow deflecting passages each including:
   a hole in the wall, the hole defining a perimeter;
   a first flow deflecting member extending from the first side of the wall, the first flow deflecting member joined to the wall at a first portion of the perimeter; and
   a second flow deflecting member extending from the second side of the wall, the second flow deflecting member joined to the wall at a second portion of the perimeter.

2. The exhaust conduit of claim 1, wherein the wall includes a plate and the holes of the plurality of flow deflecting passages are included in the plate.

3. The exhaust conduit of claim 2, wherein the holes of the plurality of flow deflecting passages are formed holes, wherein a first portion of material from each of the formed holes is included in a corresponding one of the first flow deflecting members, and wherein a second portion of material from each of the formed holes is included in a corresponding one of the second flow deflecting members.

4. The exhaust conduit of claim 3, wherein the first flow deflecting members and the second flow deflecting members are formed scoop-shaped deflecting members.

5. The exhaust conduit of claim 2, wherein the plate defines a plurality of notches disposed at a periphery of the plate, the notches extending through the first side and the second side of the wall.

6. The exhaust conduit of claim 1, wherein the first flow deflecting member and the second flow deflecting member of a corresponding one of the flow deflecting passages define a passage axis and at least partially face each other about the passage axis.

7. The exhaust conduit of claim 6, wherein the passage axis is disposed at an angle $\alpha$ with respect to the first side of the wall, the angle $\alpha$ being in a range of 30 degrees to 60 degrees.

8. The exhaust conduit of claim 1, wherein the wall includes a flow blocking portion adapted to block flow of the exhaust gases parallel to the longitudinal axis of the exhaust conduit through the flow blocking portion.

9. The exhaust conduit of claim 1, wherein each of the first and the second flow deflecting members includes compound curvature.

10. A flow device comprising:
    a plate having a first side and an oppositely disposed second side;

a first plurality of flow deflectors formed from the plate, the first plurality of flow deflectors extending outwardly from the first side of the plate;

a second plurality of flow deflectors formed from the plate, the second plurality of flow deflectors extending outwardly from the second side of the plate;

each of the first plurality of flow deflectors corresponding to one of the second plurality of flow deflectors to form a pair, wherein a first set of the flow deflector pairs is disposed at a first radial spacing from a center of the plate and a second set of the flow deflector pairs is disposed at a second radial spacing from the center of the plate, the second radial spacing being different from the first radial spacing;

a plurality of holes in the plate, each of the holes corresponding to one of the flow deflector pairs;

wherein a first portion of material from each of the holes is included in the corresponding one of the flow deflectors of the first plurality of flow deflectors; and wherein a second portion of material from each of the holes is included in the corresponding one of the flow deflectors of the second plurality of flow deflectors.

11. The flow device of claim 10, wherein each of the flow deflectors includes compound curvature.

12. The flow device of claim 11, wherein each of the flow deflectors is a scoop-shaped flow deflector.

13. The flow device of claim 10, wherein the flow deflectors of each flow deflector pair are oppositely disposed about the corresponding hole.

14. The flow device of claim 10, further comprising a central flow passage extending through the plate, wherein the plurality of holes are positioned around the central flow passage.

15. The flow device of claim 14, wherein the plate defines a plurality of notches disposed at a periphery of the plate, the notches extending through the first side and the second side of the plate.

16. The flow device of claim 15, wherein the holes of the plurality of holes and the notches of the plurality of notches are alternately arranged about a central axis.

17. An exhaust treatment system comprising:
an exhaust conduit for conveying exhaust gases from an engine of a vehicle, the exhaust conduit defining a longitudinal axis;
an aftertreatment device disposed in the exhaust conduit; and
a flow device disposed upstream of the aftertreatment device, the flow device comprising:
a plate having an upstream side and an oppositely disposed downstream side;
an opening that extends through the upstream side and the downstream side of the plate;
a plurality of first flow deflecting members extending from the upstream side of the plate, each of the first flow deflecting members including a perimeter having a portion that extends around a first portion of the opening; and
a plurality of second flow deflecting members extending from the downstream side of the plate, each of the second flow deflecting members including a perimeter having a portion that extends around a second portion of the opening;
wherein the first and second flow deflecting members include a first set disposed at a first radial distance from the longitudinal axis and a second set disposed at a second radial distance from the longitudinal axis, and wherein the second radial distance is less than the first radial distance;
wherein the opening is one of a plurality of the openings that extends through the upstream side and the downstream side of the plate; and
wherein the pluralities of the flow deflecting members are arranged to cause the exhaust gases to swirl about a central axis of the flow device.

18. The exhaust treatment system of claim 17, wherein:
each of the openings has a corresponding one of the first flow deflecting members; and
each of the openings also has a corresponding one of the second flow deflecting members.

19. An exhaust treatment system comprising:
an exhaust conduit for conveying exhaust gases from an engine of a vehicle, the exhaust conduit defining a longitudinal axis;
an aftertreatment device disposed in the exhaust conduit; and
a flow device disposed upstream of the aftertreatment device, the flow device comprising:
a plate having an upstream side and an oppositely disposed downstream side;
an opening that extends through the upstream side and the downstream side of the plate;
a plurality of first flow deflecting members extending from the upstream side of the plate, each of the first flow deflecting members including a perimeter having a portion that extends around a first portion of the opening; and
a plurality of second flow deflecting members extending from the downstream side of the plate, each of the second flow deflecting members including a perimeter having a portion that extends around a second portion of the opening, and each of the second flow deflecting members positioned about a second circular arrangement;
wherein the first and second flow deflecting members include a first set disposed at a first radial distance from the longitudinal axis about a first circular arrangement and a second set disposed at a second radial distance from the longitudinal axis about a second circular arrangement, and wherein the second radial distance is less than the first radial distance.

* * * * *